(12) United States Patent
Mori et al.

(10) Patent No.: US 10,978,076 B2
(45) Date of Patent: Apr. 13, 2021

(54) SPEAKER RETRIEVAL DEVICE, SPEAKER RETRIEVAL METHOD, AND COMPUTER PROGRAM PRODUCT

(71) Applicants: Kabushiki Kaisha Toshiba, Minato-ku (JP); Toshiba Digital Solutions Corporation, Kawasaki (JP)

(72) Inventors: Kouichirou Mori, Kawasaki (JP); Masaru Suzuki, Kawasaki (JP); Yamato Ohtani, Kawasaki (JP); Masahiro Morita, Yokohama (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 44 days.

(21) Appl. No.: 16/573,243

(22) Filed: Sep. 17, 2019

(65) Prior Publication Data
US 2020/0013409 A1 Jan. 9, 2020

Related U.S. Application Data

(63) Continuation of application No. PCT/JP2017/034573, filed on Sep. 25, 2017.

(30) Foreign Application Priority Data

Mar. 22, 2017 (JP) .............................. JP2017-056495

(51) Int. Cl.
*G10L 15/06* (2013.01)
*G10L 13/04* (2013.01)
(Continued)

(52) U.S. Cl.
CPC ............ *G10L 17/00* (2013.01); *G10L 13/033* (2013.01); *G10L 13/04* (2013.01); *G10L 15/07* (2013.01); *G10L 15/20* (2013.01); *G10L 25/54* (2013.01)

(58) Field of Classification Search
CPC ......... G10L 13/04; G10L 13/06; G10L 13/07; G10L 13/08; G10L 15/06
See application file for complete search history.

(56) References Cited

U.S. PATENT DOCUMENTS

2006/0178871 A1 * 8/2006 Seltzer .................. G10L 15/063
  704/205
2006/0178875 A1 * 8/2006 Seltzer .................. G10L 15/063
  704/222

(Continued)

FOREIGN PATENT DOCUMENTS

JP       2017-58513 A    3/2017
WO    WO 2009/110613 A1  9/2009

OTHER PUBLICATIONS

Yusuke Ijima et al., "Similar Speaker Selection Technique Based on Distance Metric Learning Using Highly Correlated Acoustic Features with Perceptual Voice Quality Similarity", IEICE Trans. Inf. & Syst., vol. E98-D, No. 1, Jan. 2015, pp. 157-165.

(Continued)

*Primary Examiner* — Shreyans A Patel
(74) *Attorney, Agent, or Firm* — Oblon, McClelland, Maier & Neustadt, L.L.P.

(57) ABSTRACT

A speaker retrieval device includes a first converting unit, a receiving unit, and a searching unit. The first converting unit converts, using an inverse transform model of a first conversion model for converting score vectors representing the features of voice quality into acoustic models, pre-registered acoustic models into score vectors; and registers the score vectors in a corresponding manner to a speaker identifier in score management information. The receiving unit receives input of a score vector. The searching unit searches the score management information for the speaker identifiers whose score vectors are similar to the received score vector.

9 Claims, 13 Drawing Sheets

(51) Int. Cl.
*G10L 13/06* (2013.01)
*G10L 13/07* (2013.01)
*G10L 13/08* (2013.01)
*G10L 17/00* (2013.01)
*G10L 15/07* (2013.01)
*G10L 15/20* (2006.01)
*G10L 25/54* (2013.01)
*G10L 13/033* (2013.01)

(56) References Cited

U.S. PATENT DOCUMENTS

| | | | | |
|---|---|---|---|---|
| 2009/0018828 A1* | 1/2009 | Nakadai | | G10L 21/028 |
| | | | | 704/234 |
| 2013/0262087 A1* | 10/2013 | Ohtani | | G06F 40/40 |
| | | | | 704/9 |
| 2014/0142946 A1* | 5/2014 | Chen | | G10L 13/08 |
| | | | | 704/266 |
| 2016/0027430 A1* | 1/2016 | Dachiraju | | G10L 13/06 |
| | | | | 704/262 |
| 2017/0076715 A1 | 3/2017 | Ohtani et al. | | |
| 2020/0013409 A1* | 1/2020 | Mori | | G10L 15/20 |

OTHER PUBLICATIONS

MakotoTachibana et al., "A Technique for Controlling Voice Quality of Synthetic Speech Using Multiple Regression HSMM," Interspeech 2006-ICSLP, 2006, pp. 2438-2441.

Ohtani et. al, "A Study on Speaker Control Method Based on Perception Expressions Using Cluster Adaptive Learning in Statistical Speech Synthesis", The Journal of the Acoustical Society of Japan (Spring), 2016, pp. 287-288 and English Translation (Ohtani et al. Machine translation).

Keiichi Tokuda et al., "Speech Synthesis Based on Hidden Markov Models", Proceedings of the IEEE, vol. 101, No. 5, May 2013, pp. 1234-1252.

* cited by examiner

FIG.2

| SPEAKER MANAGEMENT INFORMATION | | | | | | | 12A |
|---|---|---|---|---|---|---|---|
| SPEAKER ID | SPEECH DATA | TEXT OF SPEECH | ACOUSTIC FEATURE QUANTITY | LINGUISTIC FEATURE | ACOUSTIC MODEL | SCORE VECTOR | |
| A | | | | | | Sa | |
| B | | | | | | Sa | |
| C | | | | | | | |
| D | | | | | | | |
| E | | | | | | | |
| F | | | | | | Sa | |
| G | | | | | | Sa | |
| H | | | | | | Sa | |

FIG.3

| SPEAKER ID | FEATURES OF VOICE QUALITY | | | | | | |
|---|---|---|---|---|---|---|---|
| | GENDER | AGE | BRIGHT-NESS | HARD-NESS | CLARITY | FLUENCY | HOARSE-NESS |
| A | 0.5 | 0.1 | 1.0 | 0.2 | 0.7 | 0.1 | 0.2 |
| B | 0.1 | 0.2 | 0.8 | 0.4 | 0.9 | 0.8 | 0.1 |
| C | 0.9 | 0.5 | 0.4 | 0.5 | 0.9 | 0.8 | 0.3 |
| D | 1.0 | 0.9 | 0.2 | 0.6 | 0.4 | 0.7 | 0.9 |
| ... | | | | | | | |

FIG.4

SCORE MANAGEMENT INFORMATION 12C

| SPEAKER ID | SPEECH DATA | TEXT OF SPEECH | ACOUSTIC FEATURE QUANTITY | LINGUISTIC FEATURE | ACOUSTIC MODEL | SCORE VECTOR |
|---|---|---|---|---|---|---|
| A | | | | | | Sa |
| B | | | | | | Sa |
| C | | | | | | Sb |
| D | | | | | | |
| E | | | | | | Sb |
| F | | | | | | Sa |
| G | | | | | | Sa |
| H | | | | | | Sa |

FIG.10

SPEECH MANAGEMENT INFORMATION 13E

| SPEAKER ID | SPEECH DATA |
|---|---|
| D | //////// |
| X | //////// |
| Y | //////// |
| Z | //////// |

SPEAKER RETRIEVAL DEVICE, SPEAKER RETRIEVAL METHOD, AND COMPUTER PROGRAM PRODUCT

CROSS-REFERENCE TO RELATED APPLICATIONS

This application is a continuation of PCT International Application No. PCT/JP2017/034573 filed on Sep. 25, 2017, which designates the United States, incorporated herein by reference. The PCT International Application No. PCT/JP2017/034573 claims the benefit of priority from Japanese Patent Application No. 2017-056495, filed on Mar. 22, 2017, incorporated herein by reference.

FIELD

Embodiments described herein relate generally to a speaker retrieval device, a speaker retrieval method, and a computer program product.

BACKGROUND

In recent years, with the development in a speech synthesis technology, synthetic speeches of high quality can be created from texts. Particularly, it is known that, by implementing the speech synthesis technology using the hidden Markov model (HMM), a synthetic speech can be flexibly controlled by manipulating the acoustic model. Moreover, a technology has been proposed by which acoustic feature quantities are extracted from input speech; a degree of similarity is obtained between the acoustic feature quantities of the input speech and the acoustic feature quantities of each speaker in a speech database; and speakers having high degrees of similarity in voice quality with the input speech are retrieved. With the use of this technology, by extracting the acoustic feature quantities from the speech of the desired speaker and by obtaining the similarity between the acoustic feature quantities, candidate speakers having voice qualities close to the voice quality of the desired speaker can be retrieved from a large-scale speech database.

However, in the conventional technology, speech samples of the speaker desired by the user needs to be prepared in advance as a query. Hence, in the conventional technology, unless the speech of the desired speaker can be prepared, speakers having similar voice qualities cannot be retrieved. That is, in the conventional technology, it is difficult to search for speakers having high degrees of similarity in the voice quality.

[Patent Literature 1] WO/2009/110613

[Non Patent Literature 1] Yusuke Ijima et al. Similar Speaker Selection Technique Based on Distance Metric Learning Using Highly Correlated Acoustic Features with Perceptual Voice Quality Similarity, IEICE Trans. INF. & SYST., Vol. E98-D, No. 1 (2015)

BRIEF DESCRIPTION OF THE DRAWINGS

FIG. 2 is a schematic diagram illustrating an exemplary data configuration of speaker management information;

FIG. 3 is a schematic diagram illustrating an example of score vectors;

FIG. 4 is a schematic diagram illustrating an exemplary data configuration of score management information;

FIG. 10 is a schematic diagram illustrating an exemplary data configuration of speech management information;

DETAILED DESCRIPTION

A speaker retrieval device includes a first converting unit, a receiving unit, and a searching unit. The first converting unit converts, using an inverse transform model of a first conversion model for converting a score vector representing features of voice quality into an acoustic model, a pre-registered acoustic model into a score vector; and registers the score vector in a corresponding manner to a speaker identifier in score management information. The receiving unit receives input of a score vector. The searching unit searches the score management information for the speaker identifiers whose score vectors are similar to the received score vector.

Exemplary embodiments of the speaker retrieval device, the speaker retrieval method, and the computer program product are described below in detail with reference to the accompanying drawings.

First Embodiment

Figure 1:
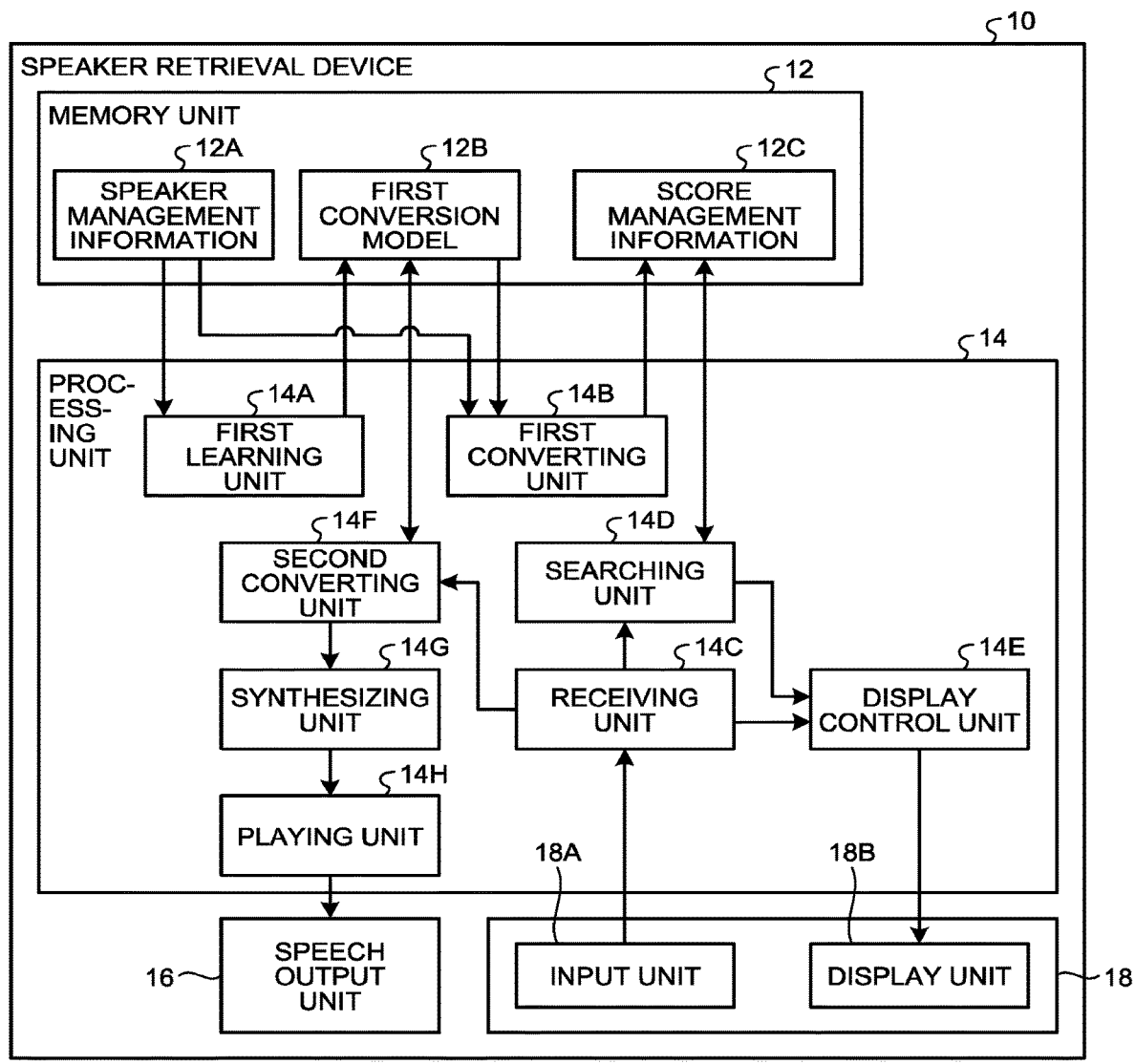
FIG. 1 is a diagram illustrating an example of a speaker retrieval device.

FIG. 1 is a diagram illustrating an example of a speaker retrieval device 10 according to a first embodiment.

The speaker retrieval device 10 is a device that searches for speakers having the desired voice quality by the user. The speaker retrieval device 10 includes a memory unit 12, a processing unit 14, a speech output unit 16, and a user interface (UI) unit 18.

The memory unit 12, the speech output unit 16, and the UI unit 18 are connected to the processing unit 14 via a bus in a manner enabling transmission and reception of data and signals.

The speech output unit 16 outputs speeches. For example, the speech output unit 16 is a speaker device.

The UI unit 18 includes an input unit 18A and a display unit 18B. The input unit 18A receives user operations. For example, the input unit 18A is a pointing device such as a digital pen, a mouse, or a trackball, or is an input device such as a keyboard. The display unit 18B displays a variety of information. For example, the display unit 18B is a display such as an LCD, or is a projector device. Meanwhile, the UI unit 18 can be a touch-sensitive panel in which the input unit 18A and the display unit 18B are configured in an integrated manner.

The memory unit 12 is used to store a variety of data. For example, the memory unit 12 is a semiconductor memory device such as a random access memory (RAM) or a flash memory; is a hard disk; or is an optical disk. Alternatively, the memory unit 12 can be a memory device installed on the outside of the speaker retrieval device 10. Still alternatively, the memory unit 12 can be a memory medium. More particularly, the memory medium can be used to store or temporarily store computer programs and a variety of information downloaded via a local area network (LAN) or the Internet. Meanwhile, the memory unit 12 can be configured using a plurality of memory mediums.

In the first embodiment, the memory unit 12 is used to store speaker management information 12A, a first conversion model 12B, and score management information 12C.

The speaker management information 12A represents information related to the speeches of speakers. The speaker management information 12A is stored in advance in the memory unit 12. FIG. 2 is a schematic diagram illustrating an exemplary data configuration of the speaker management information 12A.

The speaker management information 12A represents a database in which the following items are stored in a corresponding manner: speaker ID, speech data, text of speech, acoustic feature quantities, linguistic features, acoustic model, and score vector. However, the data format of the speaker management information 12A is not limited to a database. Alternatively, for example, the speaker management information 12A can be in the form of a table.

A speaker ID represents the identification information enabling identification of a speaker (i.e., represents speaker identification information). As long as speaker IDs enable identification of speakers, it serves the purpose. For example, the names of the speakers serve as the speaker IDs.

A set of speech data represents the data of the speech of a speaker who is identified by the corresponding speaker ID. In the speaker management information 12A, a plurality of sets of speech data (for example, N number of sets of speech data (where N is an integer equal to or greater than two) is registered in a corresponding manner to the speaker IDs. There is no restriction on the data format of the speech data. Examples of the data format of the speech data include WAV, AIFF, and BWF.

A text of speech represents the recorded script of a set of speech data.

Acoustic feature quantities represent a set of feature quantities of the speech (sound) as extracted from the corresponding set of speech data. Herein, as an acoustic feature quantity, it is possible to use an acoustic feature quantity adapted in the HMM speech synthesis (HMM stands for Hidden Markov Model). For example, an acoustic feature quantity can be the mel-cepstrum coefficient, or the mel-LPC, or the mel-LSP coefficient representing the vocal sound or the voice; or can be the fundamental frequency (F0) representing the pitch of the voice; or can be the aperiodicity index (BAP) representing the ratio of the periodic/aperiodic components of the voice. In the speaker management information 12A, it is assumed that a set of acoustic feature quantities corresponding to each registered speaker ID is derived in advance and is registered in advance in the speaker management information 12A.

Linguistic features represent a set of features of the language as extracted from the corresponding text of speech. Examples of the linguistic features include the previous and next phonemes; information related to the pronunciation; the position of the end of phrase; the sentence length; the accent phrase length; the mora length; the mora position; the accent type; the part of speech; and the dependency information. In the speaker management information 12A, a set of linguistic features corresponding to each registered speaker ID is derived in advance and is registered in advance in the speaker management information 12A.

The acoustic model is obtained by statistically modeling the mapping of the linguistic features of the speech of a speaker onto the acoustic feature quantities of the speech. For example, as the acoustic model, the acoustic model in the HMM speech synthesis is used. The acoustic model is modeled using a decision tree in which a set of linguistic features serves as the input and a set of acoustic feature quantities is obtained as the output. An acoustic feature quantity included in the output is expressed using a set of a mean vector of the multidimensional normal distribution and a covariance matrix as assigned to each leaf node of the decision tree. From the acoustic feature quantities and the linguistic features of the speaker, mean vectors and covariance matrixes representing the parameters of the acoustic model are estimated, and accordingly the acoustic model is generated.

In the first embodiment, the explanation is given about a case in which the decision tree is used in the acoustic model as in the conventional HMM speech synthesis framework. However, the configuration is not limited to using the decision tree in the acoustic model. Alternatively, for example, an arbitrary model such as a neural network in which the linguistic features are mapped onto the acoustic feature quantities can be used in the acoustic model.

In the speaker management information 12A, it is assumed that the acoustic models corresponding to the registered speaker IDs are derived in advance and are registered in advance in the speaker management information 12A. Meanwhile, in the first embodiment, regarding some of the speaker IDs in the speaker management information 12A, the acoustic models may not be registered in a corresponding manner.

A score vector represents the features of the voice quality of a speaker. In the first embodiment, a score vector represents subjective features of the voice quality of a speaker.

FIG. 3 is a schematic diagram illustrating an example of the score vectors. A score (i.e. a numerical value) in a score vector expresses a subjective strength of the features of the voice quality of a speaker for each type of feature of the voice quality. The types of features of the voice quality do not imply physical feature quantities, but are obtained by subjectively classifying the voice quality. The types of features of the voice quality can be set in advance. Examples of the types of features of the voice quality include "gender", "age", "brightness", "hardness", "clarity", "fluency", and "hoarseness". Thus, in a score vector, the subjective features of a speaker are expressed using axes that are assigned with labels according to the subjective types representing the voice quality.

The scores corresponding to such types of features indicate the strengths of those types of features. Herein, a score is expressed as a numerical value, for example. FIG. 3 illustrates a case in which the scores are expressed in the range from "0" to "1". For example, regarding the feature type "gender" of the voice quality, a score closer to "0" implies a more feminine feature and a score closer to "1" implies a more masculine feature. Moreover, regarding the feature type "age" of the voice quality, a score closer to "0" implies a lower age and a score closer to "1" implies a higher age.

Hence, in the example illustrated in FIG. 3, the score vector corresponding to a speaker ID "A" indicates that the features of the voice quality of the speaker identified by the speaker ID "A" imply a young child's voice. Moreover, the score vector corresponding to a speaker ID "B" indicates that the features of the voice quality of the speaker identified by the speaker ID "B" imply a young woman's voice. Furthermore, the score vector corresponding to a speaker ID "D" indicates that the features of the voice quality of the speaker identified by the speaker ID "D" imply an elderly man's voice.

Returning to the explanation with reference to FIG. 2, in the speaker management information 12A, it is assumed that score vectors are registered, in advance, corresponding to some of a plurality of speaker IDs registered in the speaker management information 12A. Herein, it is assumed that, for some of the speaker IDs specified in the speaker management information 12A, according to a questionnaire related to the voice quality of the speakers identified by the concerned speaker IDs, score vectors are assigned in advance in such a way that the subjective perception of a large number of people about the corresponding voice quality gets reflected.

Meanwhile, the number of speaker IDs registered in the speaker management information 12A is assumed to be such a large number of speaker IDs that makes it difficult for the user to manually search for the desired speaker from the speaker management information 12A.

Returning to the explanation with reference to FIG. 1, the following explanation is given about the first conversion model 12B and the score management information 12C. The first conversion model 12B is for converting a score vector into an acoustic model. The first conversion model 12B is learnt by the processing unit 14 and is stored in the memory unit 12 (details are given later).

The score management information 12C represents a database used at the time when the user performs a search for speakers. The score management information 12C is registered by the processing unit 14 (details are given later).

Given below is the explanation about the processing unit 14. The processing unit 14 controls the speaker retrieval device 10. The processing unit 14 includes a first learning unit 14A, a first converting unit 14B, a receiving unit 14C, a searching unit 14D, a display control unit 14E, a second converting unit 14F, a synthesizing unit 14G, and a playing unit 14H.

The abovementioned constituent elements (i.e., the first learning unit 14A, the first converting unit 14B, the receiving unit 14C, the searching unit 14D, the display control unit 14E, the second converting unit 14F, the synthesizing unit 14G, and the playing unit 14H) are implemented using, for example, one or more processors. For example, the abovementioned constituent programs can be implemented by making a central processing unit (CPU) execute computer programs, that is, can be implemented using software. Alternatively, the abovementioned constituent programs can be implemented using a processor such as a dedicated integrated circuit (IC), that is, can be implemented using hardware. Still alternatively, the abovementioned constituent programs can be implemented using a combination of software and hardware. When a plurality of processors is used, each processor either can be made to implement one constituent element or can be made to implement two or more constituent elements.

Meanwhile, at least either one of the abovementioned constituent elements can be installed in a cloud server that performs operations in cloud.

The first learning unit 14A learns the first conversion model 12B from the speaker management information 12A. As described above, the first conversion model 12B is for converting score vectors into acoustic models.

The first learning unit 14A identifies, from among a plurality of speaker IDs registered in the speaker management information 12A, a plurality of speaker IDs for which score vectors are registered. Then, the first learning unit 14A uses the acoustic models and the score vectors corresponding to the identified speaker IDs, and learns a single first conversion model 12B.

For example, the first learning unit 14A uses the multiple regression hidden semi-Markov model (HSMM) disclosed in Non Patent Literature 2 or uses the cluster adaptive learning disclosed in Non Patent Literature 3, and learns the first conversion model 12B from the speaker management information 12A.

(Non Patent Literature 2) Tachibana et. al. "A technique for controlling voice quality of synthetic speech using multiple regression HSMM", in Proceedings of INTER-SPEECH 2006, pp. 2438-2441 (2006)

(Non Patent Literature 3) Ohtani et. al, "A study on speaker control method based on perception expressions using cluster adaptive learning in statistical speech synthesis", The Journal of the Acoustical Society of Japan (Spring) (2016)

In the first embodiment, the explanation is given for an example in which the first learning unit 14A learns the first conversion model 12B using the multiple regression HSMM. However, alternatively, the first learning unit 14A can learn the first conversion model 12B from the speaker management information 12A using some other method. For example, the first learning unit 14A can learn the first conversion model 12B using an algorithm such as a neural network for learning the mapping of vectors onto vectors.

In the case of using the multiple regression HSMM, the first conversion model 12B is expressed using Equation (1) given below.

$$\mu = Hs + b \qquad (1)$$

Equation (1) represents the first conversion model 12B. In Equation (1), $\mu$ represents a total mean vector of an acoustic model expressed using a normal distribution. Sometimes $\mu$ is called a super vector. The super vector is a concatenation of the mean vectors of all leaf nodes of a decision tree in an acoustic model.

In Equation (1), s represents a score vector; H represents a conversion matrix; and b represents a bias vector. Moreover, the score vector s is expressed using Equation (2) given below.

$$s = (s1, s2, \ldots, sL) \qquad (2)$$

In Equation (2), s represents a score vector. Moreover, si (where i is an integer equal to or greater than one and equal to or smaller than L) represents the score of the i-th type of the voice quality feature in the score vector. Furthermore, L represents the number of types of features of the voice quality.

In the case of using the multiple regression HSMM, the first learning unit 14A identifies, from among the speaker IDs included in the speaker management information 12A, the speaker IDs associated with score vectors. Then, the first learning unit 14A uses, as learning data in the speaker management information 12A, the mean vector $\mu$ of the acoustic models corresponding to the identified speaker IDs and the score vectors s corresponding to the identified speaker IDs. Subsequently, using the learning data, the first learning unit 14A obtains the conversion matrix H and the bias vector b according to maximum likelihood estimation.

As a result, the first learning unit 14A generates the first conversion model 12B given above in Equation (1), and registers the first conversion model 12B in the memory unit 12. That is, the first learning unit 14A stores, as the first conversion model 12B in the memory unit 12, Equation (1) by which the conversion matrix H and the bias vector b are identified.

As a result of using the first conversion model 12B, acoustic models (the total mean vectors μ of the acoustic models) can be derived from the score vectors s. That is, as a result of using the first conversion model 12B, the processing unit 14 becomes able to synthesize the speeches having the voice quality represented by arbitrary score vectors.

Given below is the explanation about the first converting unit 14B. The first converting unit 14B converts the acoustic models, which are registered in the speaker management information 12A, into score vectors using the first conversion model 12B, and registers the score vectors in a corresponding manner to the speaker IDs in the score management information 12C. Herein, since the first conversion model 12B is for converting the score vectors into acoustic models, the first converting unit 14B uses the inverse transform model of the first conversion model 12B; converts the acoustic models, which are registered in the speaker management information 12A, into score vectors; and registers the score vectors in the score management information 12C.

Firstly, the explanation is given about the score management information 12C. FIG. 4 is a schematic diagram illustrating an exemplary data configuration of the score management information 12C.

In an identical manner to the speaker management information 12A, the score management information 12C is a database in which the following items are stored in a corresponding manner: speaker ID, speech data, text of speech, acoustic feature quantities, linguistic features, acoustic model, and score vector. However, the data format of the score management information 12C is not limited to a database. Alternatively, for example, the score management information 12C can be in the form of a table.

In the score management information 12C, all of the data specified in the speaker management information 12A is registered. Moreover, in the score management information 12C, in a corresponding manner to the speaker IDs for which score vectors are not registered in the speaker management information 12A, the score vectors obtained by conversion by the first converting unit 14B are also registered.

Hence, as illustrated in FIG. 4, score vectors Sa that are registered in the speaker management information 12A (see FIG. 2) are reflected without modification in the score management information 12C. Moreover, regarding the speaker IDs for which score vectors are not registered in the speaker management information 12A (for example, speaker IDs "C" and "E"), score vectors Sb that are obtained by conversion by the first converting unit 14B are registered in the score management information 12C.

Returning to the explanation with reference to FIG. 1, in the first embodiment, the first converting unit 14B identifies such speaker IDs in the speaker management information 12A for which score vectors are not registered. In the configuration of the speaker management information 12A as illustrated in FIG. 2, the first converting unit 14B identifies the speaker IDs for which score vectors are not registered (for example, identifies speaker IDs "C", "D", and "E").

Then, the first converting unit 14B uses the inverse transform model of the first conversion model 12B, and converts the acoustic models of the identified speaker IDs into score vectors corresponding to those speaker IDs.

More specifically, the first converting unit 14B deforms Equation (1) representing the first conversion model 12B, and derives Equation (3) given below that represents the inverse transform model. Herein, Equation (3) represents the inverse transform model of inverse mapping of the first conversion model 12B.

$$S=(H^TH)^{-1}H^T(\mu-b) \qquad (3)$$

In Equation (3), the definitions of s, H, μ, and b are identical to Equations (1) and (2) given earlier.

The first converting unit 14B identifies the conversion matrix H and the bias vector b from the first conversion model 12B. Then, as the inverse transform model of the first conversion model 12B, the first converting unit 14B uses Equation (3) in which the conversion matrix H and the bias vector b are applied. Subsequently, the first converting unit 14B derives score vectors S (with reference to FIG. 4, the score vectors Sb) from the total mean vectors μ of the acoustic models corresponding to such speaker IDs in the speaker management information 12A for which score vectors are not registered. Then, the first converting unit 14B registers the derived score vectors in a corresponding manner to the concerned speaker IDs in the score management information 12C.

Thus, in the first embodiment, after all of the data registered in the speaker management information 12A is registered in the score management information 12C, the first converting unit 14B further registers the derived score vectors in a corresponding manner to the concerned speaker IDs in the score management information 12C.

Hence, as described above, the score vectors Sa that are registered in the speaker management information 12A (see FIG. 2) are reflected without modification in the score management information 12C (see FIG. 4). On the other hand, regarding such speaker IDs in the speaker management information 12A for which score vectors are not registered (for example, regarding the speaker IDs "C" and "E"), the score vectors Sb that are obtained by conversion by the first converting unit 14B are registered in the score management information 12C. In the examples illustrated in FIGS. 2 and 4, since the speaker ID "D" does not have an acoustic model associated thereto, the first converting unit 14B cannot derive a score vector. Hence, in the first embodiment, regarding the speaker ID "D", no score vector is registered in the score management information 12C.

Meanwhile, all score vectors in the score management information 12C can be the score vectors obtained by conversion by the first converting unit 14B. In that case, the first converting unit 14B can convert the acoustic model corresponding to each speaker ID, which is registered in the speaker management information 12A, into a score vector using the inverse transform model of the first conversion model 12B; and can register that score vector in the score management information 12C.

In the first embodiment, the explanation is given for an example in which the speaker management information 12A and the first conversion model 12B are different databases. However, the speaker management information 12A and the first conversion model 12B can be configured as a single set of management information (i.e., as a single database).

Moreover, in the score management information 12C, as long as at least the score vectors corresponding to the speaker IDs are registered; at least one of the speech data, the text of speech, the acoustic feature quantity, the linguistic features, and the acoustic model may not be registered.

Meanwhile, in the case of using the multiple regression HSMM, as described above, the first converting unit 14B can derive score vectors from the acoustic models using the inverse transform model of the first conversion model 12B. On the other hand, in the case of using a method such as a neural network in which inverse mapping is analytically not required, in an identical manner to the learning of the first conversion model 12B, the first converting unit 14B can separately learn a model obtained by mapping of the mean vectors $\mu$ of the acoustic models onto score vectors. Then, using that model, the first converting unit 14B can derive the score vectors from the acoustic models.

Returning to the explanation with reference to FIG. 1, the receiving unit 14C receives input of the score vectors. The user operates the input unit 18A, and inputs a score vector that indicates the features of the speech of the speaker to be searched for. As described earlier, a score vector is a vector in which the subjective features of a speaker are expressed using axes that are assigned with labels according to the subjective types representing the voice quality. Hence, instead of using the physical feature quantities, the user becomes able to use the subjective labels representing the voice quality and can input the desired voice quality to be searched for.

In order to enable the input of a score vector, the display control unit 14E performs control to display an input screen in the display unit 18B.

The display control unit 14E performs control to display various images and a variety of information in the display unit 18B. In the first embodiment, the display control unit 14E displays an input screen, which is for receiving the input of a score vector, in the display unit 18B.

Figure 5:
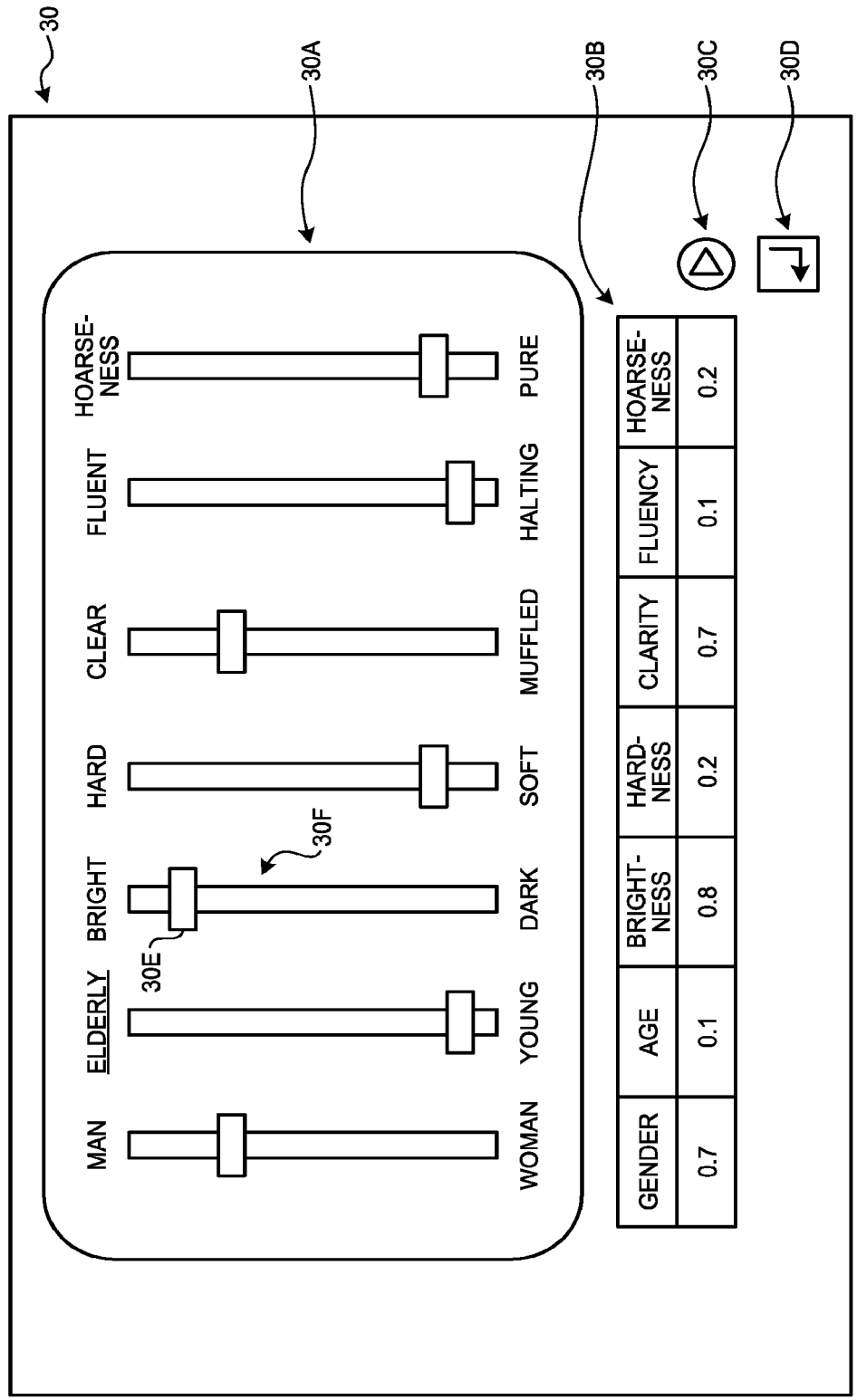
FIG. 5 is a schematic diagram illustrating an example of an input screen.

FIG. 5 is a schematic diagram illustrating an example of an input screen 30. The input screen 30 includes a score vector entry field 30A, a score vector display field 30B, a play button 30C, and a decision button 30D.

The score vector entry field 30A is for enabling the user to input a score vector representing the voice quality of the desired speaker to be searched. For example, in the score vector entry filed 30A, a sliding bar 30F for inputting a score is displayed for each type of feature of the voice quality. The user operates the input unit 18A while referring to the input screen 30, and adjusts the positions of knobs 30E provided on the sliding bars 30F. As a result of this operation, the user inputs a score for each type of feature of the voice quality.

The score vector display field 30B is a display field in which the scores indicated by the score vector, which is input in the score vector entry field 30A, are displayed according to the types of features of the voice quality.

The play button 30C is operated by the user at the time of giving an instruction to play the speech synthesized according to the score vector displayed in the score vector display field 30B. The decision button 30D is operated by the user at the time of giving an instruction to perform a search for the speakers according to the score vector displayed in the score vector display field 30B.

Thus, in the score vector entry field 30A of the input screen 30, a score vector is input as a result of a user operation of the input unit 18A, and then the play button 30C is pressed.

Then, to the processing unit 14, the UI unit 18 outputs the score vector of the scores that are displayed in the score vector display field 30B in the input screen 30 at the time when the play button 30C is pressed, as well as outputs a play instruction.

The receiving unit 14C of the processing unit 14 receives the score vector and the play instruction.

Returning to the explanation with reference to FIG. 1, when the score vector and the play instruction are received from the input unit 18A, the receiving unit 14C outputs the score vector to the second converting unit 14F.

The second converting unit 14F converts the received score vector into an acoustic model using the first conversion model 12B. That is, using the first conversion model 12B, the second converting unit 14F converts the score vector, which is input as a result of a user operation of the input unit 18A, into an acoustic model of the speaker having the voice quality represented by the score vector. Then, the second converting unit 14F outputs the acoustic model, which is obtained by conversion, to the synthesizing unit 14G.

The synthesizing unit 14G synthesizes the speech by using the acoustic model received from the second converting unit 14F. The speech synthesis from the acoustic model can be performed according to a known method.

For example, using the acoustic model, the synthesizing unit 14G converts the linguistic features, which are extracted from an arbitrary text, into acoustic feature quantities; and synthesizes the speech from the acoustic feature quantities using a vocoder (for example, see Reference Literature 1).

(Reference Literature 1) Keiichi Tokuda "Speech Synthesis based on Hidden Markov Models," in Proceedings of the IEEE, vol. 101, no. 5, pp. 1234-1252, 2013.

In the conventional technology, physical feature quantities are often associated with scores on a one-to-one basis, such as associating the mel-cepstrum coefficient with the heaviness of voice, associating the fundamental frequency (F0) with the pitch of voice, and associating the periodic/aperiodic components with the hoarseness. In contrast, in the first embodiment, the first conversion model 12B representing a dedicated conversion model is learnt from the speaker management information 12A. Hence, using the first conversion model 12B, the synthesizing unit 14G can synthesize, from the acoustic models of arbitrary speakers, speeches of the voice quality having features that are felt by people in a subjective manner.

The playing unit 14H controls the speech output unit 16 so as to play the speech synthesized by the synthesizing unit 14G. The speech output unit 16 plays the speech synthesized by the synthesizing unit 14G. Hence, the user becomes able to check the speech corresponding to the score vector that was input by operating the input unit 18A. Moreover, at the time of operating the input screen 30, if the user presses the play button 30C, he or she can input the desired score vector to be searched while checking the speech corresponding to the score vector being input.

Subsequently, when the score vector to be used as the search target is decided, the user can press the decision button 30D in the input screen 30.

That is, in the score vector entry field 30A in the input screen 30, a score vector is input as a result of a user operation of the input unit 18A, and then the decision button 30D is pressed. Then, to the processing unit 14, the UI unit 18 outputs the score vector of the scores that are displayed in the score vector display field 30B in the input screen 30 at the time when the decision button 30D is pressed, and outputs a search execution instruction.

The receiving unit 14C of the processing unit 14 receives the score vector and the search execution instruction.

Upon receiving the score vector and the search execution instruction from the UI unit 18, the receiving unit 14C outputs the received information to the searching unit 14D.

The searching unit 14D searches the score management information 12C for the speaker IDs corresponding to the score vectors that are similar to the received score vector.

More specifically, the searching unit 14D applies the Euclidean distance to calculate the distance between the score vector received from the input unit 18A via the receiving unit 14C and each score vector registered in the score management information 12C. For example, the Euclidean distance is expressed using Equation (4) given below.

$$d(s, t) = \sqrt{\sum_{i=1}^{L}(s_i - t_i)^2} \quad (4)$$

In Equation (4), s represents the target score vector for searching as received from the input unit 18A via the receiving unit 14C (i.e., the score vector s represents the search query (key)). Herein, the score vector s is expressed using Equation (2) given earlier. Moreover, in Equation (4), si (where i is an integer equal to or greater than one and equal to or smaller than L) represents the score of the i-th type of feature of the voice quality in the received score vector.

Furthermore, in Equation (4), ti (where i represents an integer equal to or greater than one and equal to or smaller than L) represents the i-th type of feature of the voice quality in the score vectors registered in the score management information 12C. Herein, it is assumed that the score vectors registered in the score management information 12C have the same types of feature of the voice quality as the score vector received from the input unit 18A by the receiving unit 14C.

Moreover, in Equation (4), t represents a score vector registered in the score management information 12C. Herein, t is expressed using Equation (5) given below.

$$T=(t1,t2,\ldots,tL) \quad (5)$$

In Equation (5), L represents the number of types of features of the voice quality in an identical manner to the explanation given earlier.

Subsequently, the searching unit 14D identifies, from among the score vectors registered in the score management information 12C, the top K number of score vectors (where K is an integer equal to or greater than one) having closest distances to the score vector received from the input unit 18A via the receiving unit 14C. Subsequently, the searching unit 14D identifies the speaker IDs corresponding to the identified score vectors in the score management information 12C. As a result, the searching unit 14D retrieves, from the score management information 12C, the speaker IDs similar to the score vector received by the receiving unit 14C.

That is, in the first embodiment, instead of obtaining the degree of similarity between the voices of the speakers according to physical feature quantities such as the mel-cepstrum coefficient and the fundamental frequency (F0), the searching unit 14D searches for similar speaker IDs using the score vectors in which the subjective perception of people is reflected.

Meanwhile, the searching unit 14D can search for the speaker IDs using the score vectors obtained by performing weighting with respect to the types of features of the voice quality.

In that case, for each type of feature of the voice quality, the display control unit 14E can provide, in the input screen 30, an entry field for inputting a weighting value along with the entry field for inputting a score (with reference to FIG. 5, the sliding bars 30F); and display the input screen 30 in the display unit 18B.

The user can operate the input unit 18A while referring to the input screen 30, and further input a weighting value for each type of feature of the voice quality. In that case, the receiving unit 14C receives the score vector indicating the score for each type of feature of the voice quality; receives the weighting value with respect to each type of feature of the voice quality; and a search execution instruction.

Then, the searching unit 14D can use, as the search query (key), a score vector obtained as a result of performing weighting by the weighting value corresponding to the score of each type of feature of the voice quality in the received score vector; and can search for similar speaker IDs from the score management information 12C in an identical manner to the explanation given earlier.

More specifically, the searching unit 14D applies the Euclidian distance expressed using Equation (6) given below, and calculates the distance between the score vector received from the input unit 18A via the receiving unit 14C and each score vector registered in the score management information 12C.

$$dw(s, t) = \sqrt{\sum_{i=1}^{L} w_i(s_i - t_i)^2} \quad (6)$$

In Equation (6), s, si, t, and ti are identical to Equation (4) given earlier. Moreover, in Equation (6), w represents the weighting value. Furthermore, in Equation (6), wi represents the weighting value with respect to the i-th type of feature of the voice quality.

In this way, the searching unit 14D can search for the speaker IDs using the score vector obtained by performing weighting with respect to the types of features of the voice quality.

As a result of performing weighting, it becomes easier to search for the speaker IDs desired by the user. Meanwhile, in order to ensure that the similarity index of people about the subjective voice is matched; the processing unit 14 can perform, in advance, optimized weighting with respect to the types of features of the voice quality.

The searching unit 14D outputs, to the display control unit 14E, the retrieved speaker IDs along with the score vectors corresponding to those speaker IDs in the score management information 12C. The display control unit 14E displays a display screen, which includes the speaker IDs retrieved by the searching unit 14D, in the display unit 18B.

Figure 6:
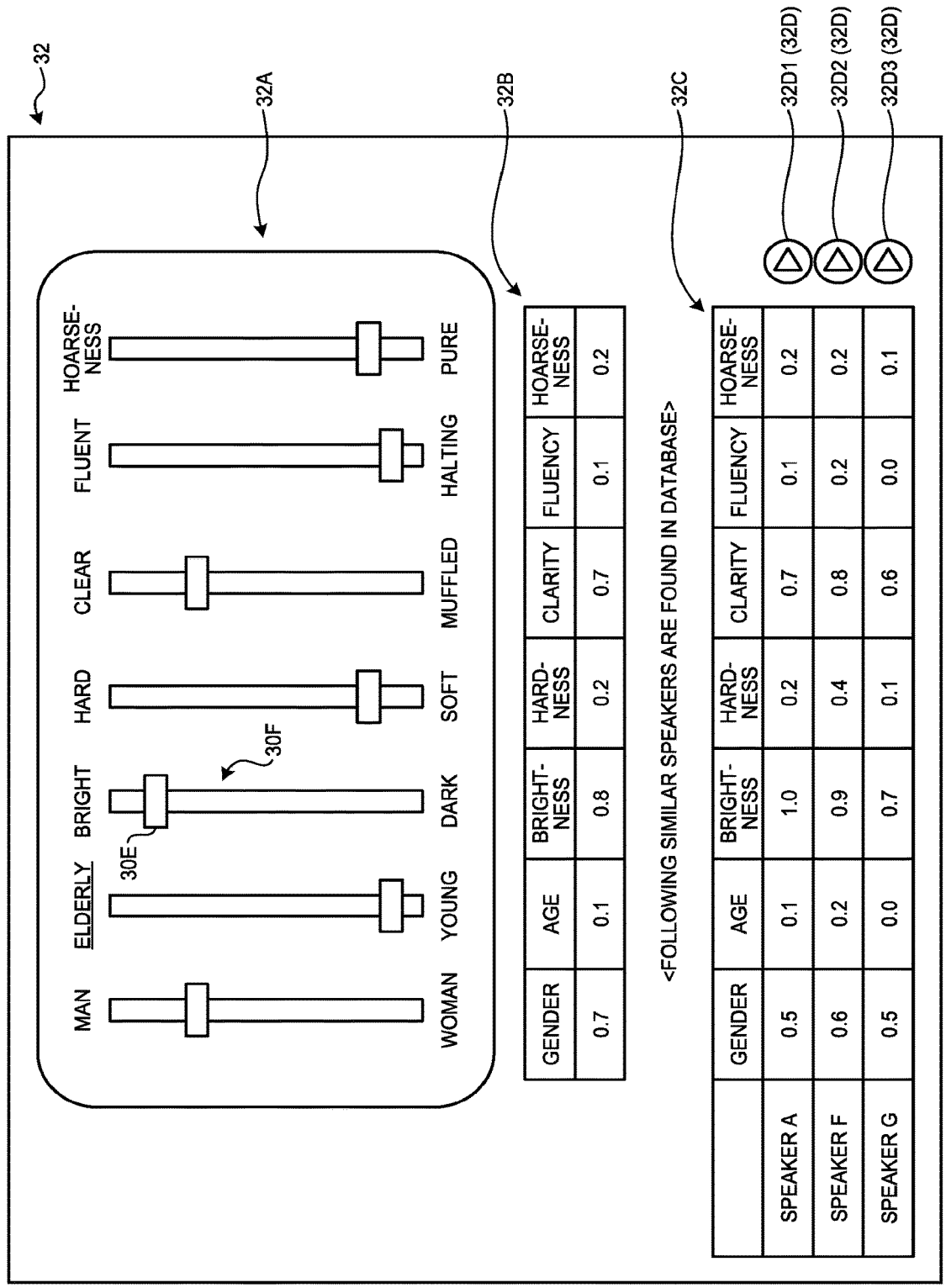
FIG. 6 is a schematic diagram illustrating an example of a display screen.

FIG. 6 is a schematic diagram illustrating an example of a display screen 32. The display screen 32 includes a score vector display field 32A, a score vector display field 32B, a search result display field 32C, and play buttons 32D.

The score vector display field 32A and the score vector display field 32B are display fields for displaying the score vector used as the search query. The search result display field 32C is a display field for displaying the search result regarding the speaker IDs that are retrieved using the score vector displayed in the score vector display field 32A and the score vector display field 32B.

In the example illustrated in FIG. 6, in the search result display field 32C, a list of speaker IDs retrieved by the searching unit 14D is displayed along with the score vectors corresponding to those speaker IDs. FIG. 6 illustrates an example for K=3 (where K represents the number of top score vectors having closest distances to the received score vector). That is, FIG. 6 illustrates an example in which three speaker IDs are retrieved as the K number of speaker IDs corresponding to the score vectors that are similar to the score vector displayed in the score vector display fields 32A and 32B.

In the search result display field 32C, in the areas corresponding to the speaker IDs, the play buttons 32D (32D1 to 32D3) are displayed. At the time of instructing the play of the speech synthesized according to the score vector having one of those speaker IDs, the user presses the corresponding play button 32D.

The user presses the play button 32D by operating the input unit 18A. As a result, the UI unit 18 outputs the score vector corresponding to that play button 32D as well as outputs a play instruction to the processing unit 14. For example, assume that the play button 32D1 is pressed. In response, the UI unit 18 outputs the score vector corresponding to the speaker ID "A" (a score vector displayed in the search result display field 32C) and a play instruction, which are corresponding to the play button 32D1, to the processing unit 14.

Upon receiving the score vector and the play instruction from the UI unit 18; the receiving unit 14C, the second converting unit 14F, the synthesizing unit 14G, and the playing unit 14H of the processing unit 14 perform identical operations to the operations described earlier. As a result, the score vector of the speaker ID corresponding to the play button 32D pressed by the user gets converted into an acoustic model, and the speech synthesized from the acoustic model gets played from the speech output unit 16.

Hence, the user becomes able to check the speech corresponding to each speaker ID displayed in the search result display field 32C.

Meanwhile, the searching unit 14D can send the search result also to an external device via a communications line such as a network. In that case, to the external device, the searching unit 14D sends the score vector that was used as the search query, the speaker IDs of the retrieved speakers, and the score vectors corresponding to those speaker IDs. As a result, using the external device that receives the information, it becomes possible to check the search result regarding the speaker corresponding to the input score vector.

Given below is the explanation of an exemplary sequence of the search operation performed in the speaker retrieval device 10.

Figure 7:
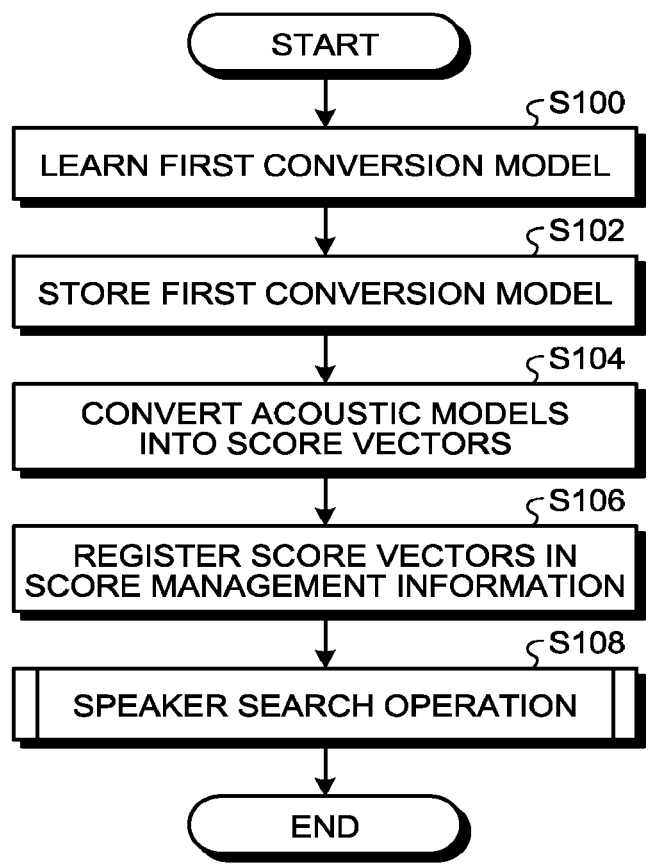
FIG. 7 is a flowchart for explaining an exemplary sequence of a search operation.

FIG. 7 is a flowchart for explaining an exemplary sequence of the search operation. Firstly, the first learning unit 14A learns the first conversion model 12B using the speaker management information 12A (Step S100). Then, the first learning unit 14A stores the learnt first conversion model 12B in the memory unit 12 (Step S102).

Subsequently, the first converting unit 14B converts the acoustic models, which are registered in the speaker management information 12A, into score vectors using the first conversion model 12B (Step S104), and registers the score vectors in the score management information (Step S106). Then, the processing unit performs a speaker search operation (Step S108). It marks the end of the present routine.

Figure 8:
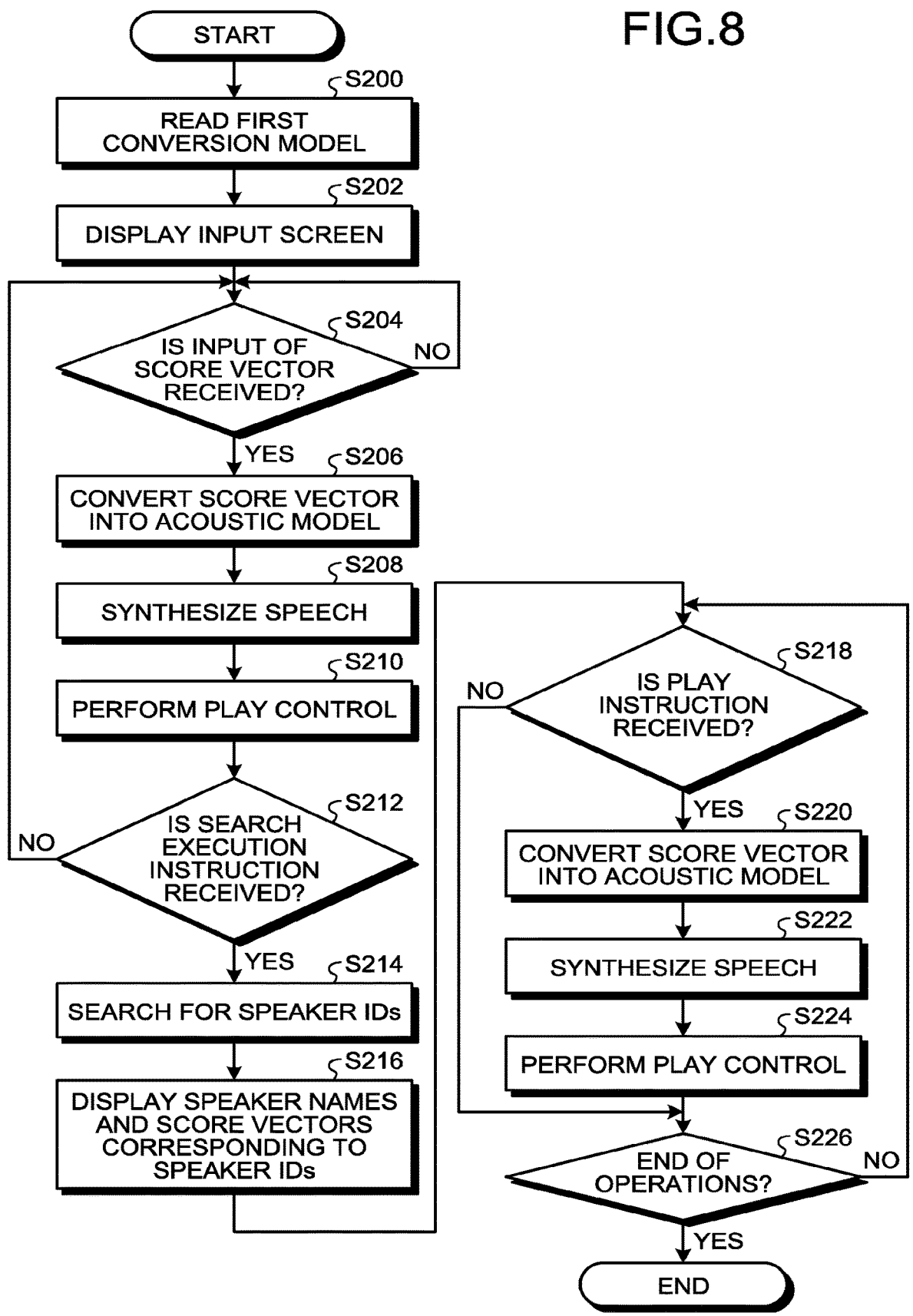
FIG. 8 is a flowchart for explaining an exemplary sequence of a speaker search operation.

FIG. 8 is a flowchart for explaining an exemplary sequence of the speaker search operation (performed at Step S108 illustrated in FIG. 7).

Firstly, the processing unit 14 reads the first conversion model 12B that is stored in the memory unit 12 (Step S200). Then, the display control unit 14E displays the input screen 30 in the UI unit 18 (Step S202). As a result of the operation performed at Step S202, for example, the input screen 30 illustrated in FIG. 5 gets displayed the UI unit 18.

The user operates the input unit 18A while referring to the input screen 30, and inputs a score for each type of feature of the voice quality. With that, the user inputs a score vector corresponding to the features of the voice quality of the speaker to be searched. Then, the user presses the play button 30C.

Until it is determined that the input of a score vector is received (Yes at Step S204), the receiving unit 14C repeatedly performs that determination (No at Step S204). For example, the receiving unit 14C performs the determination at Step S204 by determining whether or not a score vector and a play instruction are received from the input unit 18A.

If it is determined that the input of a score vector is received (Yes at Step S204), then the system control proceeds to Step S206. At Step S206, the second converting unit 14F converts the score vector, which is received at Step S204, into an acoustic model using the first conversion model 12B (Step S206). Then, the synthesizing unit 14G synthesizes the speech from the acoustic model obtained by conversion at Step S206 (Step S208). Subsequently, the playing unit 14H performs play control with respect to the speech output unit 16 so as to output the speech synthesized at Step S208 (Step S210).

As a result of the operation performed at Step S210, the speech corresponding to the score vector, which is input as a result of the user operation, is output from the speech output unit 16.

Subsequently, the receiving unit 14C determines whether or not a search execution instruction is received (Step S212). The receiving unit 14C performs the determination at Step S212 by determining whether or not a score vector and a search execution instruction are received from the input unit 18A. Meanwhile, alternatively, the determination at Step S212 can be performed when it is determined at Step S204 that the input of a score vector is not received.

If it is determined that a search execution instruction is not received (No at Step S212), then the system control returns to Step S204. On the other hand, if it is determined that a search execution instruction is received (Yes at Step S212), then the system control proceeds to Step S214.

At Step S214, the searching unit 14D searches the score management information 12C for the speaker IDs corresponding to the score vectors that are similar to the score vector received at Step S212 (Step S214).

Subsequently, the display control unit 14E displays, in the display unit 18B, the display screen 32 that includes the speaker names and score vectors corresponding to the speaker IDs retrieved at Step S214 (Step S216). As a result of the operation performed at Step S216, for example, the display screen 32 illustrated in FIG. 6 gets displayed in the display unit 18B.

Then, the receiving unit 14C determines whether or not a play instruction is received from the input unit 18A (Step S218). If it is determined that a play instruction is not received from the input unit 18A (No at Step S218), then the system control proceeds to Step S226 described later. On the other hand, if it is determined that a play instruction is received from the input unit 18A (Yes at Step S218), then the system control proceeds to Step S220.

At Step S220, the second converting unit 14F converts the score vector, which is received along with the play instruction at Step S218, into an acoustic model using the first conversion model 12B (Step S220). Then, the synthesizing unit 14G synthesizes the speech from the acoustic model obtained by conversion at Step S220 (Step S222). Subsequently, the playing unit 14H performs play control with respect to the speech output unit 16 so as to output the speech synthesized at Step S222 (Step S224).

As a result of performing the operation at Step S224, the speech corresponding to the score vector, which is input as a result of the user operation, is output from the speech output unit 16.

Then, the processing unit 14 determines whether or not to end the operations (Step S226). For example, the processing unit 14 performs the determination at Step S226 by determining whether or not the user has operated the input unit 18A and pressed a predetermined button for instructing the end of the operations. If it is determined at Step S226 to not end the operations (No at Step S226), then the system control returns to Step S218. Alternatively, if it is determined at Step S226 to not end the operations (No at Step S226), then the system control can return to Step S202. When it is determined at Step S226 to end the operations (Yes at Step S226), it marks the end of the present routine.

As described above, the speaker retrieval device 10 according to the first embodiment includes the first converting unit 14B, the receiving unit 14C, and the searching unit 14D. The first converting unit 14B uses the inverse transform model of the first conversion model 12B that is for converting a score vector representing the features of the voice quality into an acoustic model, and converts pre-registered acoustic models into score vectors; and registers the score vectors in a corresponding manner to the speaker IDs (speaker identification information) in the score management information 12C. The receiving unit 14C receives input of a score vector. The searching unit 14D searches, from the score management information 12C, the speaker IDs (speaker identification information) that are similar to the received score vector.

Conventionally, the speech data of the desired speaker for the user is used as the search query and the speakers having the desired voice for the user are retrieved. Hence, conventionally, unless the speech data of the desired speaker for the user is registered in advance, the speakers cannot be retrieved.

In contrast, in the speaker retrieval device 10 according to the first embodiment, a score vector representing the features of the voice quality is used as the search query, and the speaker IDs similar to the received score vector are retrieved from the score management information 12C. Moreover, in the speaker retrieval device 10 according to the first embodiment, pre-registered acoustic models are converted into score vectors using the first conversion model 12B that is for converting a score vector representing the features of the voice quality into an acoustic model; and the score vectors obtained by conversion are registered in a corresponding manner to the speaker IDs (speaker identification information) in the score management information 12C.

Hence, the speaker retrieval device 10 according to the first embodiment becomes able to search for the speakers having a high degree of similarity in the voice quality.

Meanwhile, in the conventional method, the speech data corresponding to each of a large number of speakers is categorized in advance, and then the desired speaker is retrieved. However, as the number of registered speakers becomes larger and larger, the load as well as the cost of the categorization task also goes on increasing.

In contrast, in the speaker retrieval device 10 according to the first embodiment, a score vector representing the features of the voice quality is used as the search query, and the speaker IDs similar to the received score vector are retrieved from the score management information 12C.

For that reason, the speaker retrieval device 10 according to the first embodiment becomes able to retrieve the speakers having a high degree of similarity in the voice quality, without causing any increase in the load and the cost attributed to categorizing, in advance, the speeches of the speakers registered in the database that serves as the base for searching.

Meanwhile, conventionally, the degree of similarity among the speakers is derived by comparing the fundamental physical feature quantities such as the mel frequency cepstrum coefficient and the fundamental frequency (F0). Hence, conventionally, there are times when the degree of similarity among the physical feature quantities does not match with the closeness among the speakers as subjectively perceived by people.

In contrast, in the speaker retrieval device 10 according to the first embodiment, the score vector used as the search query represents the subjective features of the voice quality of a speaker. Hence, in addition to achieving the abovementioned effects, the speaker retrieval device 10 according to the first embodiment becomes able to search for the speakers having a high degree of subjective similarity in the voice quality.

Second Embodiment

In the first embodiment, the explanation is given for a case in which all of the data registered in the speaker management information 12A and the score data registered in the first converting unit 14B are registered in the score management information 12C.

That is, in the first embodiment, the explanation is given for a case in which the score data registered in advance in the speaker management information 12A and the score data derived from acoustic models by the first converting unit 14B are registered in the score management information 12C.

In a second embodiment, the explanation is given for a case in which score vectors derived from the acoustic feature quantities are also registered in the score management information 12C.

Figure 9:
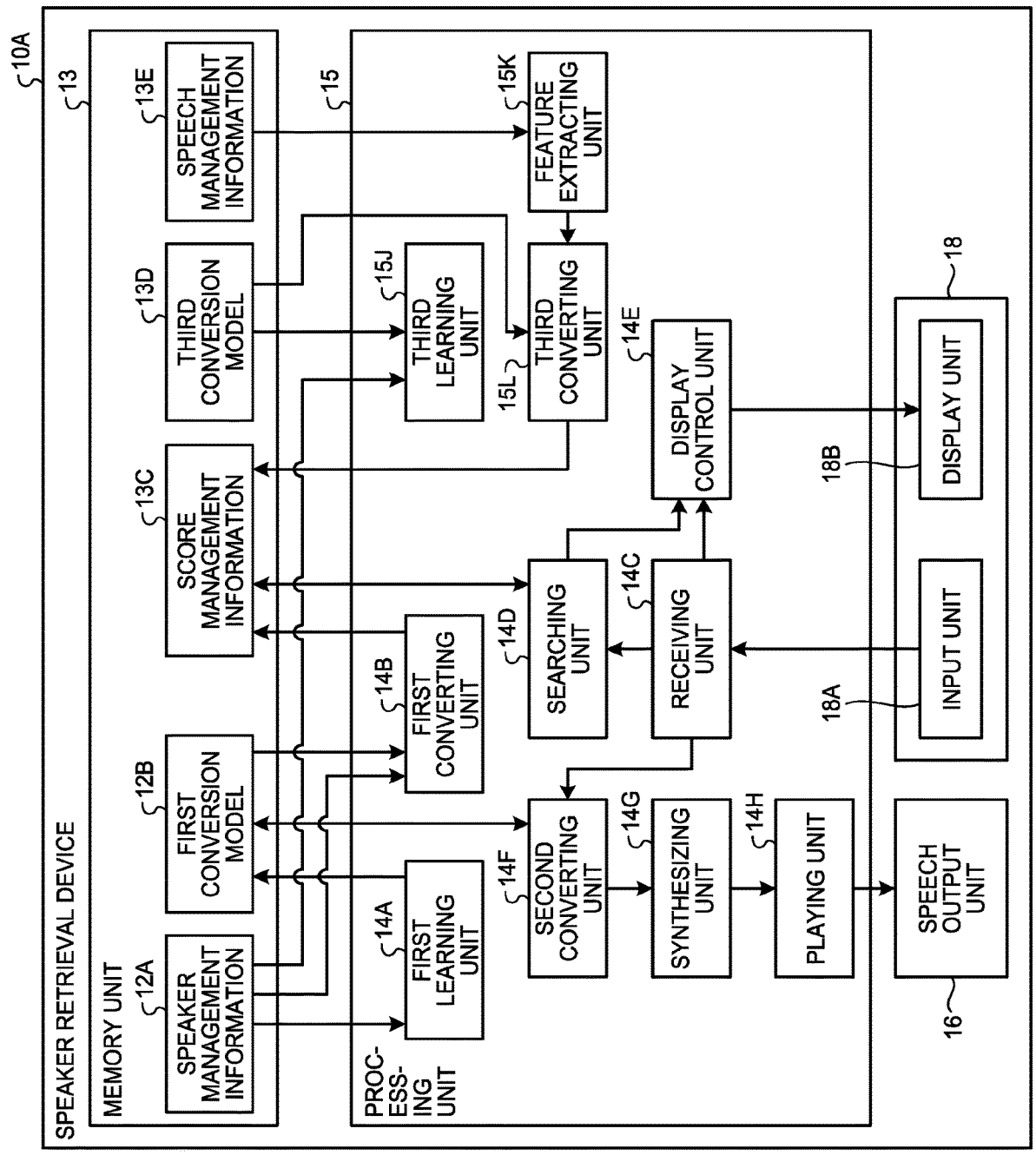
FIG. 9 is a diagram illustrating an example of a speaker retrieval device.

FIG. 9 is a diagram illustrating an example of a speaker retrieval device 10A according to the second embodiment.

The speaker retrieval device 10A includes a memory unit 13, a processing unit 15, the speech output unit 16, and the UI unit 18. The memory unit 13, the processing unit 15, and the UI unit 18 are connected to the processing unit 14 via a bus in a manner enabling transmission and reception of data and signals. Herein, the speech output unit 16 and the UI unit 18 are identical to the first embodiment.

The memory unit 13 is used to store a variety of data. For example, the memory unit 13 is a semiconductor memory device such as a RAM or a flash memory; is a hard disk; or is an optical disk. Alternatively, the memory unit 13 can be a memory device installed on the outside of the speaker retrieval device 10A. Still alternatively, the memory unit 13 can be a memory medium. Meanwhile, the memory unit 13 can be configured using a plurality of memory mediums.

In the second embodiment, the memory unit 13 is used to store the speaker management information 12A, the first conversion model 12B, score management information 13C, a third conversion model 13D, and speech management information 13E. The speaker management information 12A and the first conversion model 12B are identical to the first embodiment.

The speech management information 13E is information related to the speeches of the speakers. In the speech management information 13E is stored the information related to the speeches that are meant to be used in learning the third conversion model 13D. The speech management information 13E is stored in advance in the memory unit 13.

FIG. 10 is a schematic diagram illustrating an exemplary data configuration of the speech management information 13E. The speech management information 13E is a database in which speaker IDs and speech data are stored in a corresponding manner. However, the data format of the speech management information 13E is not limited to a database. Alternatively, for example, the speech management information 13E can be in the form of a table.

In an identical manner to the first embodiment, a speaker ID represents identification information enabling identification of a speaker (i.e., represents speaker identification information). In the speech management information 13E, from among the speaker IDs registered in the speaker management information 12A (see FIG. 2), at least such speaker IDs that do not have an acoustic model associated thereto (for example, the speaker ID "D") are registered. Moreover, in the speech management information 13E, the speaker IDs of the speakers not registered in the speaker management information 12A (for example, speaker IDs "X", "Y", and "Z") are registered.

Meanwhile, in the speech management information 13E, in addition to the speaker IDs mentioned above, at least some of the speaker IDs registered in the speaker management information 12A can also be registered.

In the speech management information 13E, a plurality of sets of speech data is registered in a corresponding manner to a speaker ID. As long as the number of sets of speech data that are registered corresponding to each speaker ID in the speech management information 13E is smaller than the number of sets of speech data registered corresponding to that speaker ID in the speaker management information 12A (i.e., smaller than N) and is greater than one, it serves the purpose.

Returning to the explanation with reference to FIG. 9, a third learning unit 15J learns the third conversion model 13D from the speaker management information 12A. The third conversion model 13D is for converting an acoustic feature quantity into a score vector.

The third learning unit 15J learns the third conversion model 13D using the acoustic feature quantity corresponding to each speaker ID registered in the speaker management information 12A and using the score vector corresponding to each speaker ID in the speaker management information 12A.

The third learning unit 15J can learn the third conversion model 13D by implementing a known method for learning the mapping of a vector of acoustic feature quantities onto a score vector. For example, the third learning unit 15J learns the third conversion model 13D using a linear regression model, a kernel regression model, or a neural network. Herein, in order to specify the parameters to be used in these models, the third learning unit 15J can use the acoustic feature quantities and the score vector corresponding to each speaker ID included in the speaker management information 12A.

Then, the third learning unit 15J stores the learnt third conversion model 13D in the memory unit 13.

A feature extracting unit 15K extracts the acoustic feature quantities from the speech data registered in the speech management information 13E. More specifically, the feature extracting unit 15K extracts, for each speaker ID registered in the speech management information 13E, the acoustic feature quantities from the speech data. The acoustic feature quantities are expressed as a vector. Herein, the feature extracting unit 15K can extract the acoustic feature quantities from the speech data using a known method.

As compared to the generation of an acoustic model, the acoustic feature quantities can be extracted from a smaller number of sets of speech data. Hence, as described above, as long as the number of sets of speech data that are registered corresponding to each speaker ID in the speech management information 13E is smaller than the number of sets of speech data registered corresponding to each speaker ID in the speaker management information 12A (i.e., smaller than N) and is greater than one, it serves the purpose.

A third converting unit 15L converts the acoustic feature quantities of a speaker into a score vector using the third conversion model 13D, and registers the score vector in the score management information 13C.

More specifically, the third converting unit 15L converts the acoustic feature quantities, which are extracted for each speaker ID from the speech management information 13E by the feature extracting unit 15K, into a score vector using the third conversion model 13D. Then, the third converting unit 15L registers the speaker IDs, which are registered in the speech management information 13E, and the score vectors in a corresponding manner in the score management information 13C.

In an identical manner to the score management information 12C, the score management information 13C is a database used at the time when a user performs a search for speakers. The score management information 13C is registered and updated by the first converting unit 14B and the third converting unit 15L.

Figure 11:
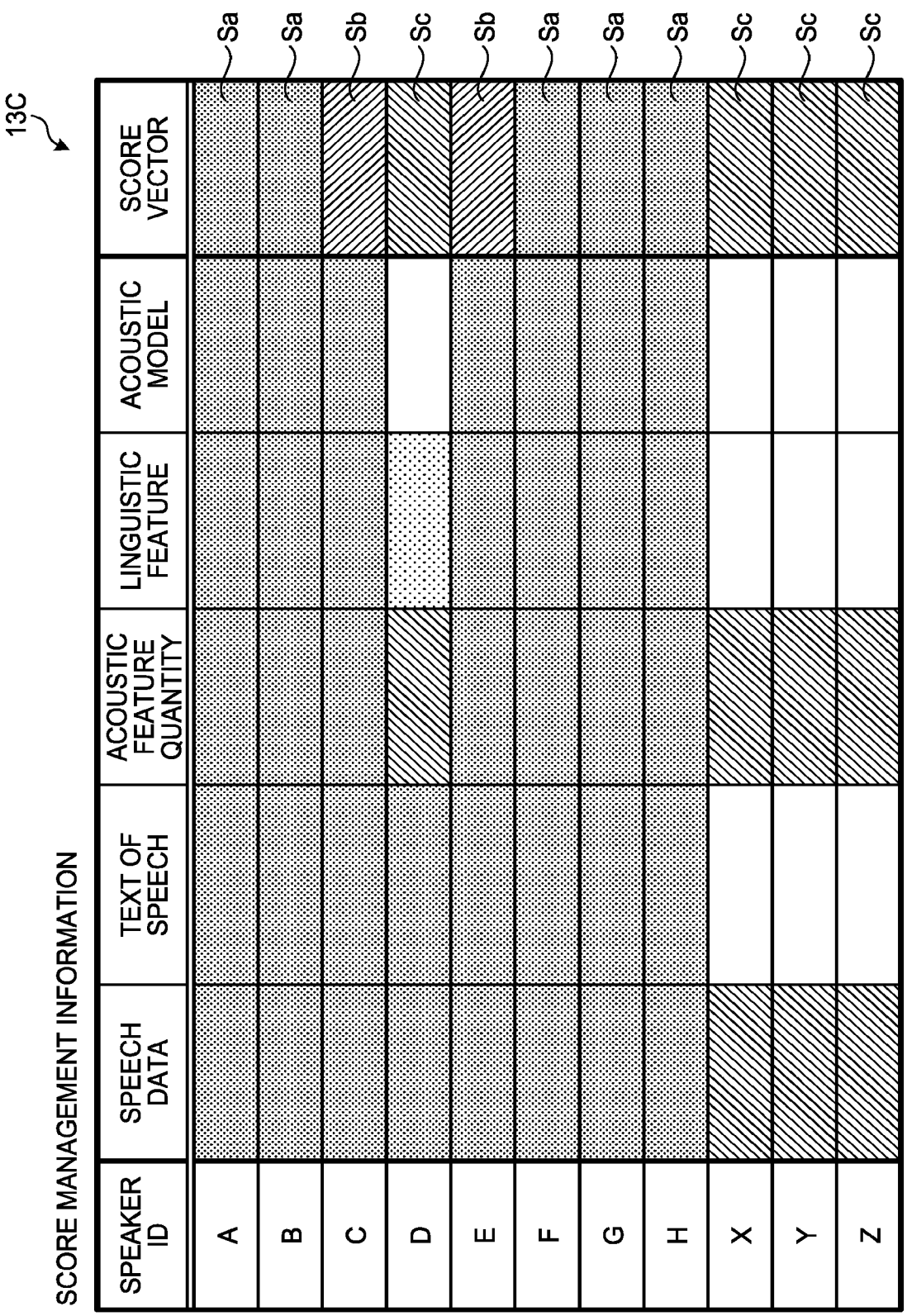
FIG. 11 is a schematic diagram illustrating an exemplary data configuration of score management information.

FIG. 11 is a schematic diagram illustrating an exemplary data configuration of the score management information 13C. In an identical manner to the speaker management information 12A and to the score management information 12C according to the first embodiment, the score management information 13C is a database in which the following items are stored in a corresponding manner: speaker ID, speech data, text of speech, acoustic feature quantity, linguistic feature, acoustic model, and score vector. However, the data format of the score management information 13C is not limited to a database. Alternatively, for example, the score management information 13C can be in the form of a table.

In the score management information 13C, in a corresponding manner to such speaker IDs in the speaker management information 12A for which score vectors are not registered, the score vectors obtained by conversion by the first converting unit 14B and the score vectors obtained by conversion by the third converting unit 15L are further registered.

In the score management information 12C (see FIG. 4) according to the first embodiment, the score vectors Sa that are registered in advance in the speaker management information 12A are registered; and the score vectors Sb that are obtained by conversion from the acoustic model by the first converting unit 14B are registered. Thus, in the score management information 12C, regarding such speaker IDs in the speaker management information 12A for which score vectors are not registered (for example, regarding the speaker ID "D"), the score vectors are not registered (see FIG. 4).

On the other hand, in the score management information 13C according to the second embodiment, as illustrated in FIG. 11, in addition to the score vectors that are registered in the score management information 12C (see FIG. 4) according to the first embodiment (i.e., in addition to the score vectors Sa and Sb), score vectors Sc obtained by conversion from acoustic feature quantities are registered. Thus, in the score management information 13C, score vectors are registered also with respect to such speaker IDs in the speaker management information 12A for which score vectors are not registered (for example, with respect to the speaker ID "D").

Moreover, in the speech management information 13E, speech data is registered corresponding to the speaker IDs that are not registered in the speaker management information 12A. The third converting unit 15L derives the score vectors using the acoustic feature quantities that are extracted from the speech management information 13E by the feature extracting unit 15K; and registers the score vectors in the score management information 13C.

Hence, in the score management information 13C, as compared to the score management information 12C used in the first embodiment, the score vectors corresponding to the speaker IDs of a greater number of speakers can be registered and can be treated as the targets for similar speaker search.

The score vectors Sb that are registered by the first converting unit 14B in the first embodiment are derived from acoustic models. Hence, the speech synthesized using the score vectors derived from the acoustic models by the second converting unit 14F and the synthesizing unit 14G is a synthetic speech (i.e., a speech that is not the real voice of the speaker but is obtained by synthesis).

On the other hand, the score vectors that are registered by the third converting unit 15L are derived using the third conversion model 13D from the acoustic feature quantities which are extracted from the speech management information 13E by the feature extracting unit 15K. Hence, the speech synthesized by the second converting unit 14F and the synthesizing unit 14G using the score vectors derived from the acoustic feature quantities represents the real voice of the speaker or represents a speech close to the real voice of the speaker.

Thus, the searching unit 14D searches the score management information 13C, instead of searching the score management information 12C, for the speaker IDs corresponding to the score vectors that are similar to the score vector received by the receiving unit 14C. As a result, the searching unit 14D becomes able to search for the speakers having the speech in the real voice besides searching for the speakers having the synthetic speech.

Moreover, in the speaker retrieval device 10A according to the second embodiment, the speakers having the synthetic speech as well as the speakers having the speech in the real voice can be retrieved using common score vectors. Hence, the synthetic speech and the real voice can be retrieved in an inter-disciplinary manner.

Thus, for example, if the voice quality of the desired synthetic speech is satisfactory, the user uses the acoustic model. However, if the voice quality is not satisfactory, the user can refer to the search result about the speaker IDs of the speakers having the voice quality of the real voice similar to the input score vector, and can request the speakers identified by those speaker IDs to perform the recording.

Figure 12:
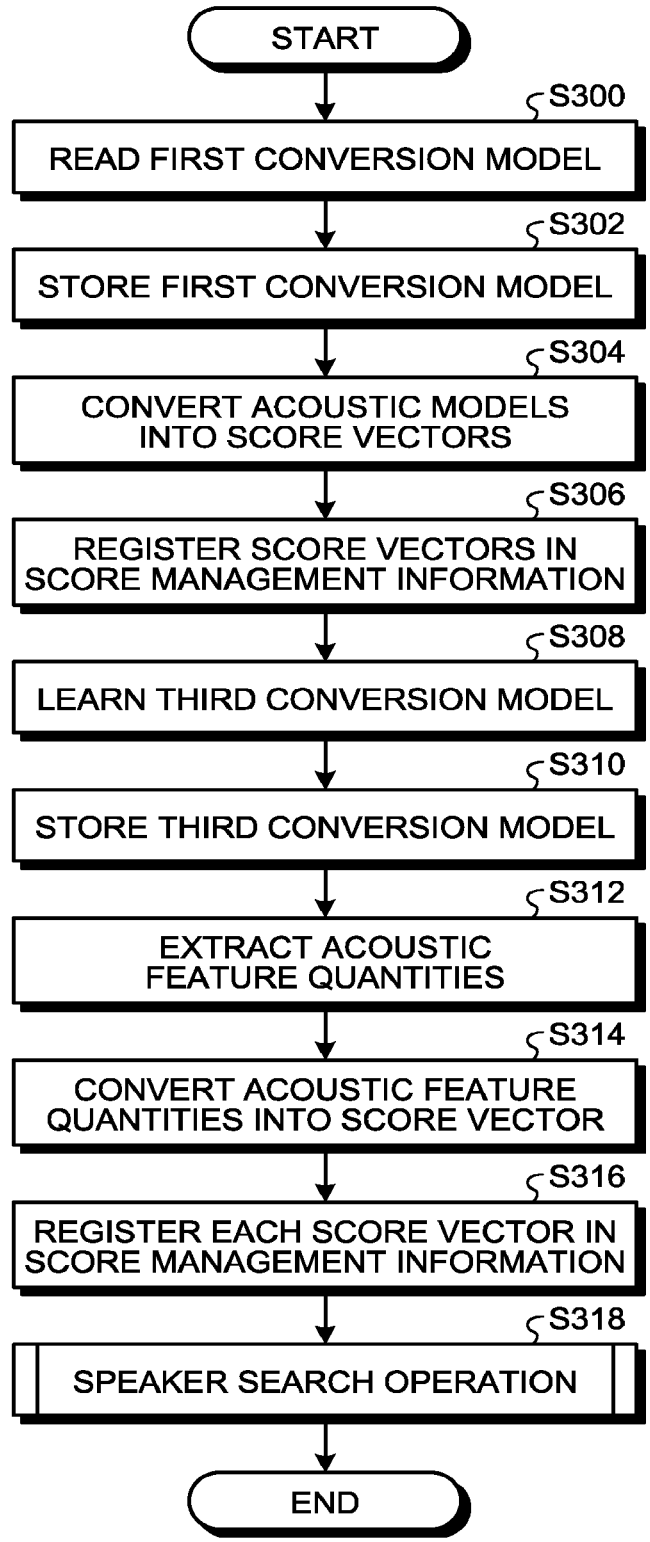
FIG. 12 is a flowchart illustrating an exemplary sequence of a search operation performed in the speaker retrieval device.

Given below is the explanation of an exemplary sequence of the search operation performed in the speaker retrieval device 10A. FIG. 12 is a flowchart illustrating an exemplary sequence of the search operation performed in the speaker retrieval device 10A.

Firstly, the processing unit 15 performs the operations from Step S300 to Step S306. The operations from Step S300 to Step S306 are identical to the operations from Step S100 to Step S106 (see FIG. 7) according to the first embodiment.

More particularly, firstly, the first learning unit 14A learns the first conversion model 12B using the speaker management information 12A (Step S300). Then, the first learning unit 14A stores the learnt first conversion model 12B in the memory unit 13 (Step S302).

Subsequently, the first converting unit 14B converts the acoustic models, which are registered in the speaker management information 12A, into score vectors using the first conversion model 12B, and registers the score vectors in the score management information 13C (Step S306).

Then, the third learning unit 15J learns the third conversion model 13D using the speaker management information (Step S308). Subsequently, the third learning unit 15J stores the learnt third conversion model 13D in the memory unit 13 (Step S310).

Then, the feature extracting unit 15K extracts the acoustic feature quantities corresponding to each set of speech data registered in the speech management information 13E (Step S312). Subsequently, the third converting unit 15L converts the acoustic feature quantities, which are extracted for each speaker ID at Step S312, into a score vector using the third conversion model 13D (Step S314).

Then, the third learning unit 15J registers, in the score management information 13C, the score vectors, which are obtained by conversion at Step S314, in a corresponding manner to the speaker IDs corresponding to those score vectors (Step S316).

Subsequently, the processing unit 15 performs a speaker search operation (Step S318). The operation performed at Step S318 is identical to the first embodiment (see Step S108 illustrated in FIG. 7, and see FIG. 8). It marks the end of the present routine.

As described above, the speaker retrieval device 10A according to the second embodiment includes the third converting unit 15L in addition to the configuration according to the first embodiment. The third converting unit 15L converts the acoustic feature quantities of a speaker into a score vector using the third conversion model 13D that is for converting acoustic feature quantities into a score vector; and registers the score vector in the score management information 13C.

Hence, in the speaker retrieval device 10A according to the second embodiment, not only the synthetic speeches but also the speeches of real voice can be treated as the search targets.

Thus, in addition to achieving the effects of the first embodiment, the speaker retrieval device 10A according to the second embodiment can search for the speakers having a high degree of similarity in the voice quality.

Moreover, in the speaker retrieval device 10A according to the second embodiment, the third converting unit 15L learns the third conversion model 13D using only the acoustic feature quantities such as the mel-cepstrum and the fundamental frequency that are not dependent on the language. Hence, in the speaker retrieval device 10A, the similar speakers can be retrieved without having to rely on the language.

Figure 13:
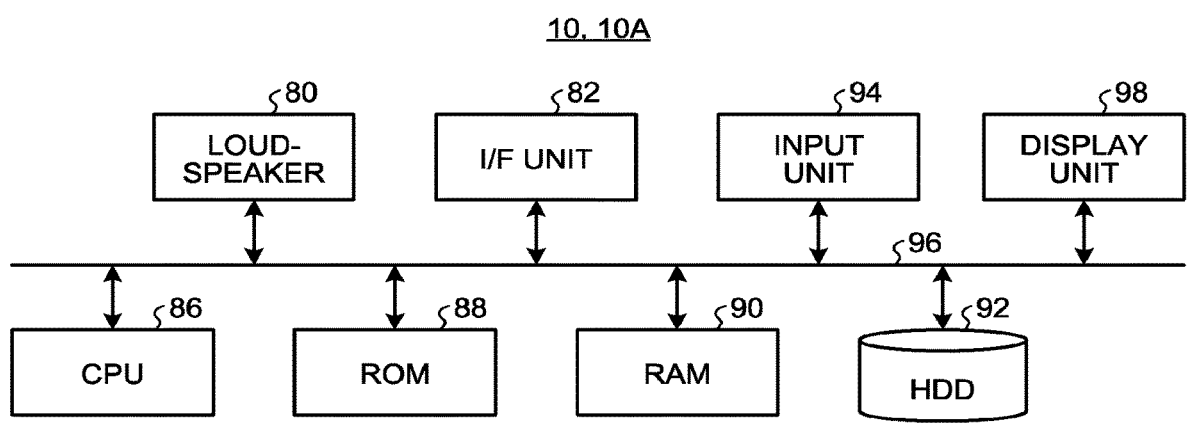
FIG. 13 is an explanatory diagram illustrating an exemplary hardware configuration of the speaker retrieval devices.

Given below is the explanation of a hardware configuration of the speaker retrieval devices 10 and 10A according to the embodiments. FIG. 13 is an explanatory diagram illustrating an exemplary hardware configuration of the speaker retrieval devices 10 and 10A according to the embodiments.

The speaker retrieval devices 10 and 10A according to the embodiments include a control device such as a central processing unit (CPU) 86; memory devices such as a read only memory (ROM) 88 and a random access memory (RAM) 90; a communication I/F 82 that establishes connection with a network and performs communication; a loudspeaker 80 that outputs sound; a display unit 98; an input unit 94; a hard disk drive (HDD) 92; and a bus 96 that connects the constituent elements to each other.

The computer programs executed in the speaker retrieval devices 10 and 10A according to the embodiments are stored in advance in the ROM 88.

Alternatively, the computer programs executed in the speaker retrieval devices 10 and 10A according to the embodiments can be recorded as installable files or executable files in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer programs executed in the speaker retrieval devices 10 and 10A according to the embodiments can be stored in a downloadable manner in a computer that is connected to a network such as the Internet. Still alternatively, the computer programs executed in the speaker retrieval devices 10 and 10A according to the embodiments can be distributed via a network such as the Internet.

The computer programs executed in the speaker retrieval devices 10 and 10A according to the embodiments can make a computer function as the constituent elements of the speaker retrieval devices 10 and 10A. In that computer, the CPU 86 can read the computer programs from a computer-readable memory medium, load them in a main memory device, and execute them.

Meanwhile, in the embodiments described above, the explanation is given under the assumption that the speaker retrieval devices 10 and 10A are configured as standalone devices. However, alternatively, each of the speaker retrieval devices 10 and 10A can be configured as a plurality of physically-separated devices connected via a network. Still alternatively, the speaker retrieval devices 10 and 10A according to the embodiments can be implemented as virtual machines running in a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speaker retrieval device comprising:
    a first converting unit that
        using an inverse transform model of a first conversion model for converting a score vector representing features of voice quality into an acoustic model, converts the acoustic model that is registered in advance into the score vector, and
        registers the score vector in a corresponding manner to a speaker identifier in score management information;
    a receiving unit that receives input of the score vector; and
    a searching unit that searches the score management information for speaker identifiers whose score vectors are similar to the received score vector.

2. The speaker retrieval device according to claim 1, wherein the score vector represents subjective features of voice quality of a speaker.

3. The speaker retrieval device according to claim 1, further comprising:
    a second converting unit that converts the received score vector into the acoustic model using the first conversion model; and
    a playing unit that plays speech that is synthesized from the acoustic model.

4. The speaker retrieval device according to claim 1, wherein the acoustic model is obtained by statistically modeling a mapping of linguistic features of speech onto acoustic feature quantities of the speech.

5. The speaker retrieval device according to claim 4, further comprising a third converting unit that
    using a third conversion model for converting the acoustic feature quantities into a score vector, converts the acoustic feature quantities of a speaker into a score vector, and
    registers the score vector in the score management information.

6. The speaker retrieval device according to claim 5, further comprising a third learning unit that learns the third conversion model for converting the acoustic feature quantities into the score vector.

7. The speaker retrieval device according to claim 1, wherein
    in the score vector, a subjective strength of a feature of the voice quality is represented as a score for each type of feature of voice quality,
    the receiving unit receives a score vector indicative of scores for respective types of features of voice quality, and weighting values with respect to respective types of features of the voice quality, and
    the searching unit searches for speaker identifiers whose score vectors are similar to the score vector obtained by performing weighting the scores included in the received score vector with corresponding weighting values.

8. A speaker retrieval method comprising:
    converting, using an inverse transform model of a first conversion model for converting a score vector representing features of voice quality into an acoustic model, the acoustic model that is registered in advance into the score vector, and registering the score vector in a corresponding manner to a speaker identifier in score management information;
    receiving input of the score vector; and
    searching the score management information for speaker identifiers whose score vectors are similar to the received score vector.

9. A computer program product having a computer readable medium including instructions, wherein the instructions, when executed by a computer, cause the computer to perform:
    converting, using an inverse transform model of a first conversion model for converting a score vector representing features of voice quality into an acoustic model, the acoustic model that is registered in advance into the score vector, and registering the score vector in a corresponding manner to a speaker identifier in score management information;
    receiving input of the score vector; and searching the score management information for speaker identifiers whose score vectors are similar to the received score vector.

\* \* \* \* \*